(12) United States Patent
Furber (10) Patent No.: US 7,457,787 B1
(45) Date of Patent: Nov. 25, 2008

(54) NEURAL NETWORK COMPONENT

(75) Inventor: Stephen B. Furber, Cheshire (GB)

(73) Assignee: The University of Manchester, Manchester (GB)

( * ) Notice: Subject to any disclaimer, the term of this patent is extended or adjusted under 35 U.S.C. 154(b) by 486 days.

(21) Appl. No.: 10/110,477

(22) PCT Filed: Oct. 16, 2000

(86) PCT No.: PCT/GB00/03957

§ 371 (c)(1),
(2), (4) Date: Jul. 17, 2002

(87) PCT Pub. No.: WO01/29766

PCT Pub. Date: Apr. 26, 2001

(30) Foreign Application Priority Data

Oct. 15, 1999 (GB) ................................. 9924310.7

(51) Int. Cl.
*G06E 1/00* (2006.01)
(52) U.S. Cl. .............................. 706/15; 706/22; 706/26; 706/35
(58) Field of Classification Search .................. 706/15, 706/26, 27, 22
See application file for complete search history.

(56) References Cited

U.S. PATENT DOCUMENTS

| | | | | |
|---|---|---|---|---|
| 4,970,679 A | * | 11/1990 | Tachibana ................... | 341/122 |
| 5,148,385 A | * | 9/1992 | Frazier ........................ | 706/41 |
| 5,278,945 A | * | 1/1994 | Basehore et al. .............. | 706/41 |
| 5,404,556 A | * | 4/1995 | Mahowald et al. ........... | 710/40 |
| 5,504,839 A | * | 4/1996 | Mobus ........................ | 706/26 |
| 5,517,600 A | | 5/1996 | Shimokawa ................. | 706/15 |
| 5,920,852 A | * | 7/1999 | Graupe ........................ | 706/26 |
| 6,363,369 B1 | * | 3/2002 | Liaw et al. ................... | 706/15 |
| 6,516,309 B1 | * | 2/2003 | Eberhart et al. .............. | 706/27 |
| 6,894,639 B1 | * | 5/2005 | Katz ........................... | 342/90 |

OTHER PUBLICATIONS

"ParSPIKE—A Parallel DSP-Accelerator for Dyn Simulation of Large Spiking Neural Networks", Wolff C., Hartmann G., Ruckert U., Microelectronics for Neural, Fuzzy and Bio-Inspired Syst, 1999. MicroNeuro 99, 7th Intl Conf on Apr. 7-9, 1999, pp. 324-331.*

"Learning pulse coded spatio-temporal neurons with a local learning rule", Klaasen A. J., Dev A., Neural Networks, 1991, IJCNN-91 Seattle International Joint Conference on vol. I, Jul. 8-14, 1991, pp. 829-836 vol. 1.*

"The Use of the Electrical Simulator SPICE for Behavioral Simulation of Artificial Neural Networks", Piuri V., Department of Electronics.*

(Continued)

*Primary Examiner*—David Vincent
*Assistant Examiner*—Mai T Tran
(74) *Attorney, Agent, or Firm*—Nixon & Vanderhye PC (57) ABSTRACT

A neural network component includes a plurality of inputs, at least one processing element, at least one output, and a digital memory storing values at addresses respectively corresponding to the at least one processing element, wherein the at least one processing element is arranged to receive a value from the digital memory in response to an input signal, and is instructed to execute one of a plurality of operations by the value that is received from the digital memory.

12 Claims, 6 Drawing Sheets

OTHER PUBLICATIONS

"An Artificial Neural Network Accelerator for Pulse coded Model-neurons", Frank G., Hartmann G., Neural Networks, 1995, Proceedings, IEEE International Conference on vol. 4, Nov. 27-Dec. 1, 1995, pp. 2014-2014.*

"A flex hardware architecture for online Hebbian learning in the sender-oriented PCNN-Neurocomp Spike 128K", Schafer M., Hartmann G., Microelectronics for Neural, Fuzzy & Bio-Inspired Syst, 1999. MicroNeuro 99, 7th Intl Conf on Apr. 7-9, 1999, pp. 316-323.*

"Pulsed Neural Networks", edited by Maass W., Bishop C. M., DPub: Nov. 30, 1998, Cambridge, MA: MIT Press, c1999.*

Webster's II New Riverside University Dictionary 1984, p. 633.*

Microsoft Press Computer Dictionary Third Edition 1997, p. 72.*

"Neuromorphic Synapses for Artificial Dendrites", W. C. Westerman, D. P. M. Northmore, J. G. Elias, Analog Integrated Circuits & Signal Processing, May-Jun. 1997, vol. 13, No. 1-2, pp. 167-184.*

"Pulse Arithmetic in VLSI Neural Networks", A. F. Murray, Micro IEEE, Dec. 1989, vol. 9, No. 6, pp. 64-74.*

"A Pulse-Coded Communications Infrastructure for Neuromorphic Systems", S. R. Deiss, R. J. Douglas, A. M. Whatley, Pulse Neural Networks, edited by Wolfgang Maass, C. M. Bishop, Nov. 30, 1998, pp. 157-178.*

"What's different with spiking neurons?" W. Gerstner, Center for Neuromimetic Systems, Apr. 27, 1999, pp. 1-16.*

"On Computation with Pulses", W. Maass, B. Ruf, Institute for Theoretical Computer Science, Technische Universitaet Graz, Klosterwiesgasse, Information & Computation, Feb. 1, 1999, vol. 148, No. 2, pp. 202-218.*

A Fascile Impulse-Rate Encoded (FIRE) Neural Architecture, S. B. Furber, Oct. 2, 2000, http://citeseer.ist.psu.edu/389164.html.*

EPO Examination Report dated Oct. 5, 2006.

* cited by examiner

NEURAL NETWORK COMPONENT

BACKGROUND

1. Technical Field

This application is the US national phase of international application PCT/GB00/03957 filed 16 Oct. 2000, which designated the US.

The present invention relates to a neural network component.

2. Related Art

Neural networks are biologically-inspired computation architectures for processing information. They are increasingly used to solve problems that are difficult to solve with conventional algorithmic programs running on conventional stored-program computers. These typically are pattern-matching problems such as stock market forecasting, image recognition and speech recognition. Some neural network applications are commercially significant. For example, the touch-pads of many lap-top personal computers use a neural network to improve reliability (neural systems are relatively noise-insensitive).

Neurons are generally multiple input, single output devices. The strength of the output signal from a neuron is a function of the weighted sum of that neuron's inputs and may be represented by the following equation:

$$Y_i = f_i\left(\sum_j W_{ij} \cdot X_j - T_i\right)$$

Where $X_j$ are inputs to the neuron (possibly from other neurons), $W_{ij}$ are weights applied to the inputs, the sum $$\sum_j W_{ij} \cdot X_j$$

is the activation level of the neuron (an internal measurement of the state of the neuron), $T_i$ is the threshold of the neuron, $f_i$ is an activation function (this is usually non-linear), and $Y^i$ is the output of ith neuron. An output will be generated by the neuron when the activation level exceeds the threshold.

A weight associated with a given input may be positive, in which case a signal received at that input will cause the activation level to increase. A positive weight may therefore be considered to be an excitory input. In some instances a weight associated with a given input may be negative, in which case a signal received at that input will cause the activation level to decrease. A negative weight may therefore be considered to be an inhibitory input.

Connections between neurons are reinforced or weakened by adjusting the values of the weights. For example, a weight associated with a particular input of a given neuron may be increased each time a signal is received at that input. A recurring input signal (i.e. a signal received several times at the same input) will gradually increase the weight associated with that input. A signal received at that input will then cause a larger increase of the activation level of the neuron.

The activation function is usually the same for all neurons and is fixed; often a sigmoid function is used.

The activity of the ith neuron in known neural networks is limited to being a monotonic function of its inputs $X_j$, determined by the values of the weights $W_{ij}$. This restricts the ability of known neural networks to emulate more complex, non-monotonic behaviours.

BRIEF SUMMARY

It is an object of the present invention to provide a component of a neural network which overcomes the above disadvantage.

According to a first aspect of the invention there is provided a neural network component, the component comprising a plurality of inputs, at least one processing element, at least one output, and a digital memory storing values at addresses respectively corresponding to the at least one processing element, wherein the at least one processing element is arranged to receive a value from the digital memory in response to an input signal, and is instructed to execute one of a plurality of operations by the value that is received from the digital memory.

The invention contrasts with prior art neural networks, where a value received by a processing element is always added to an activation level of the processing element (the value is always a weight). The processing element of the invention is capable of executing a plurality of operations, and the received value must therefore act as an instruction in order for the processing element to choose one of the instructions for execution.

The activation level of a processing element is an internal value indicative of the excitation of that processing element.

Suitably, the operation is the addition of the value to an activation level of the at least one processing element.

Suitably, the operation is a decay of an activation level of the at least one processing element to zero, by increasing the activation level if it is negative or decreasing the activation level if it is positive.

Suitably, the rate of decay is dependent upon the value received from the digital memory.

Preferably, the decay is controlled by a clock.

Suitably, the operation comprises generation of an output by the at least one processing element, and then resetting an activation level of the at least one processing element to a predetermined minimum level.

Suitably, the operation comprises resetting an activation level of the at least one processing element to a predetermined minimum level without an output being generated by the at least one processing element.

Suitably, the operation comprises modifying an activation level of the at least one processing element in accordance with an automatic learning algorithm.

Suitably, the operation comprises modifying the value held in the digital memory in accordance with an automatic learning algorithm.

Suitably, the automatic learning algorithm comprises a Hebbian learning algorithm.

Suitably, the output generated by the neural network component comprises a number representative of the address of the processing element from which the output emanated.

Suitably, the neural network component is provided with arbitration and encoding means arranged to determine the chronological order of signal pulses received from processing elements, and to represent each signal pulse as a number. This is advantageous because it overcomes the problem of pin restriction for off-chip communication, replacing for example 256 pins, if each neuron output has its own pin, by 8 pins (where 8-bit binary address encoding is used).

Suitably, the neural network component further comprises a conventional processor with read-write access to the digital memory.

Suitably, accesses to the digital memory by the conventional processor are arbitrated asynchronously with accesses required by the neural processing elements.

Suitably, a large number of neural network components are supervised by a parallel network of conventional processors.

Preferably, the digital memory is a Random Access Memory.

Suitably the component works in an asynchronous manner. Alternatively, the neural network component may work in a clocked manner.

According to a second aspect of the invention there is provided a method of operating a neural network component, the method comprising storing values in a digital memory at addresses respectively corresponding to at least one processing element, transferring a value to the at least one processing element and executing one of a plurality of operations at the processing element in response to the value that is received from the digital memory.

The method may include any of the above suitable or preferable features of the first aspect of the invention.

BRIEF DESCRIPTION OF THE DRAWINGS

A specific embodiment of the invention will now be described by way of example only with reference to the accompanying Figures, in which.

DETAILED DESCRIPTION OF EXEMPLARY EMBODIMENTS

Figure 1:
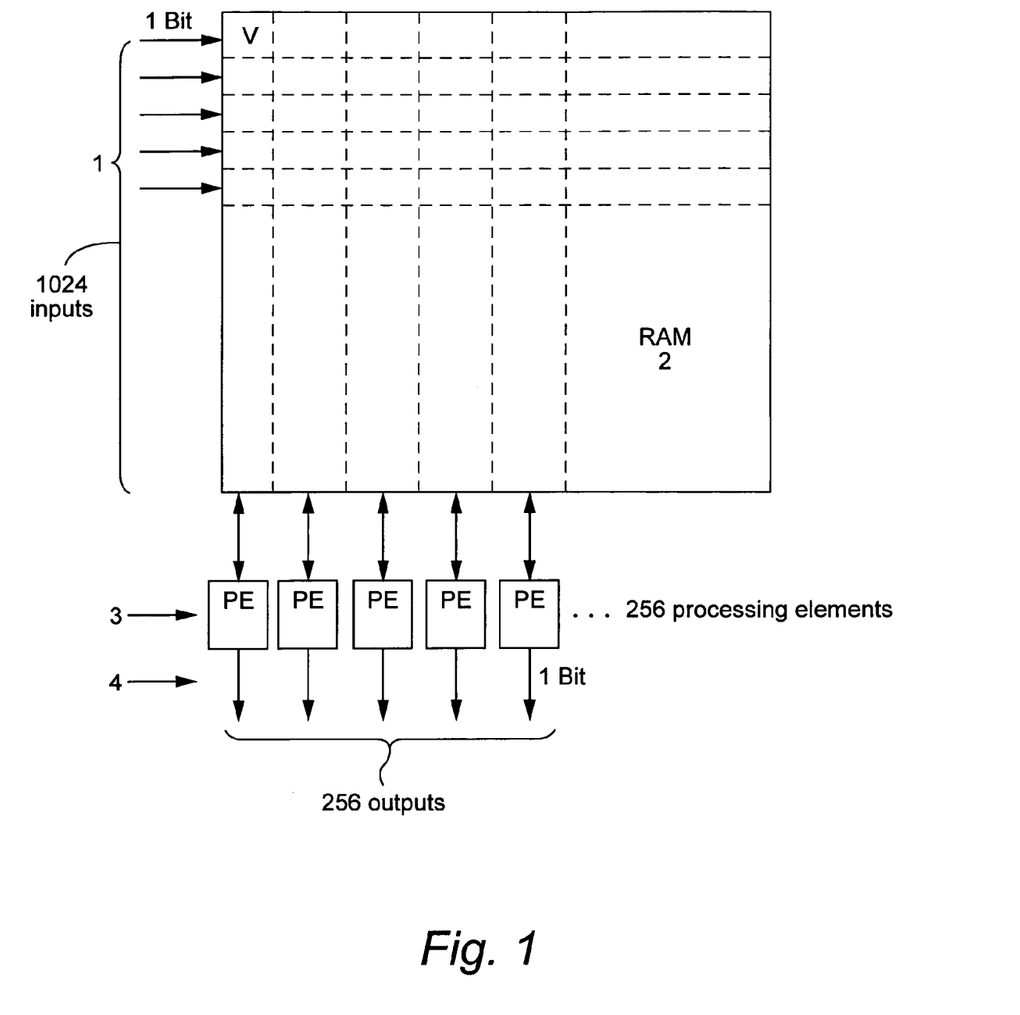
FIG. 1 is a schematic representation of an embodiment of a neural network component according to the invention.

A neural network component as shown in FIG. 1 comprises 1024 inputs 1, a Random Access Memory (RAM) 2, 256 processing elements 3 and 256 outputs 4.

Each input carries a signal from a processing element of a previous neural network component. Each input carries only 1 bit of information, in other words it is either 'on' or 'off'. Input signals take the form of pulses on the inputs.

The RAM 2 contains a set of values. A different address in the RAM is allocated to each combination of input and output (the number of addresses is 1024×256). Referring to FIG. 1, in order to assist the reader and for illustration purposes only, the RAM may be considered to be a two dimensional matrix comprising columns and rows, each row containing all of the values pertaining to a particular input, and each column containing all of the values pertaining to a particular processing element. As discussed further below, a significant proportion of the RAM addresses may contain zero values.

In response to a pulse received at a given input, the RAM 2 looks up values located in the row corresponding to that input. Each value is passed to the processing element 3 corresponding to the column in which that value is located. The activation level of the processing element 3 (an internal measurement of the state of the processing element) is modified in accordance with the value that is received. Each processing element 3 acts as a neuron, and has 1024 inputs and 1 output.

In contrast to the prior art, the values stored in the RAM 2 may be weights or they may be instructions. Where the value passed to a processing element 3 is an instruction, the processing element 3 carries out an operation in accordance with the instruction, as described further below. Where the value passed to the processing element 3 is a weight, that weight is added to the activation level of the processing element 3. The operation of a processing element 'i' may be expressed mathematically as:

$$Y_i = f_i\left(\sum_j W_{ij} \cdot X_j - T_i\right)$$

Where $X_j$ are inputs to the neuron, $W_{ij}$ are the weights, the sum $$\sum_j W_{ij} \cdot X_j$$

is the activation level of the neuron, $T_i$ is the threshold of the processing element, $f_i$ is an activation function (this is usually non-linear), and $Y_i$ is the output of ith processing element. A pulse is output by the processing element when the activation level exceeds the threshold (this is in effect the firing of the neuron).

In the present example, j, which designates a specific input may be between 1 and 1024, and i, which designates a specific output may be between 1 and 256.

Many prior art neural networks comprise neurons which generate analogue output values. For example, referring to the above equation, the output $Y_i$ of a neuron would be a number having a value between 0 and 1. This output, when input to a subsequent neuron would be multiplied by a weight, and the result of the multiplication added to the activation level of that subsequent neuron.

The described embodiment of the invention operates in a different manner to analogue neural networks, in that a processing element (neuron) has only two possible outputs, i.e. 1 or 0 (or equivalently 'on' or 'off'). An output pulse is generated by a processing element whenever the activation level of that processing element exceeds its threshold. From an outside observer's point of view, a pulsed output of a processing element may be considered to be equivalent to an analogue output. For example, if a processing element were to generate 23 pulses in one second, then this could be considered to be equivalent to a notional analogue value of 0.23. The generation of pulses by the processing elements is referred to hereafter as 'pulse rate encoding'.

At first sight it might appear that pulse rate encoding is very computationally intensive when compared to the use of analogue signals. For example, a weight allocated to a given input of a neuron may be multiplied by the analogue signal 0.23 in a single calculation, and then added to the activation level of the neuron. In contrast to this, when using pulse rate encoding the weight must be added to the activation level of the neuron 23 times (i.e. once per pulse), requiring 23 separate calculations. It is noted however that there is often no output from a given neuron. Where pulse rate encoding is used, no calculations are carried out in this eventuality since no input pulses are received. In contrast to this, in known analogue neural networks, a zero value of output is effectively an output value that happens to be zero. The weights of the neurons are multiplied by the zero output value, and the result (also zero) is added to the activation levels of the neurons. This calculation, which has no effect on the activation levels of the neurons occurs very frequently and is computationally very wasteful. The use of pulse rate encoding avoids this wasteful multiplication by zero.

Figure 2:
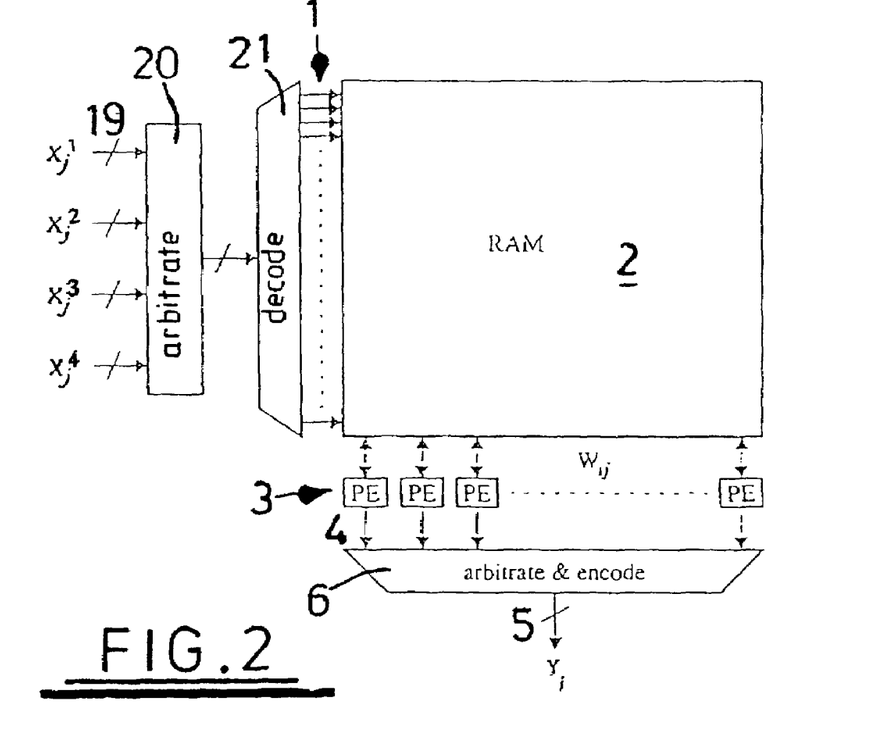
FIG. 2 is a schematic representation the neural network component, including arbitration and encoding means.

The neural network component is provided with 256 processing elements 3. Each processing element 3 acts as a neuron, and has 1024 inputs and 1 output. If individual connections were to be provided between each processing element and each subsequent neural network component, then the number of connections would rapidly become so large as to be impractical. In order to avoid this problem, as shown in FIG. 2, the outputs from the processing elements are all directed into a single 8-bit output line 5. An output pulse from a given processing element is converted into an 8-bit binary number representative of that processing element, which is carried by the output line. This conversion, which may be referred to as 'addressed-event encoding' is carried out by an arbitration and encoding unit 6.

Figure 3:
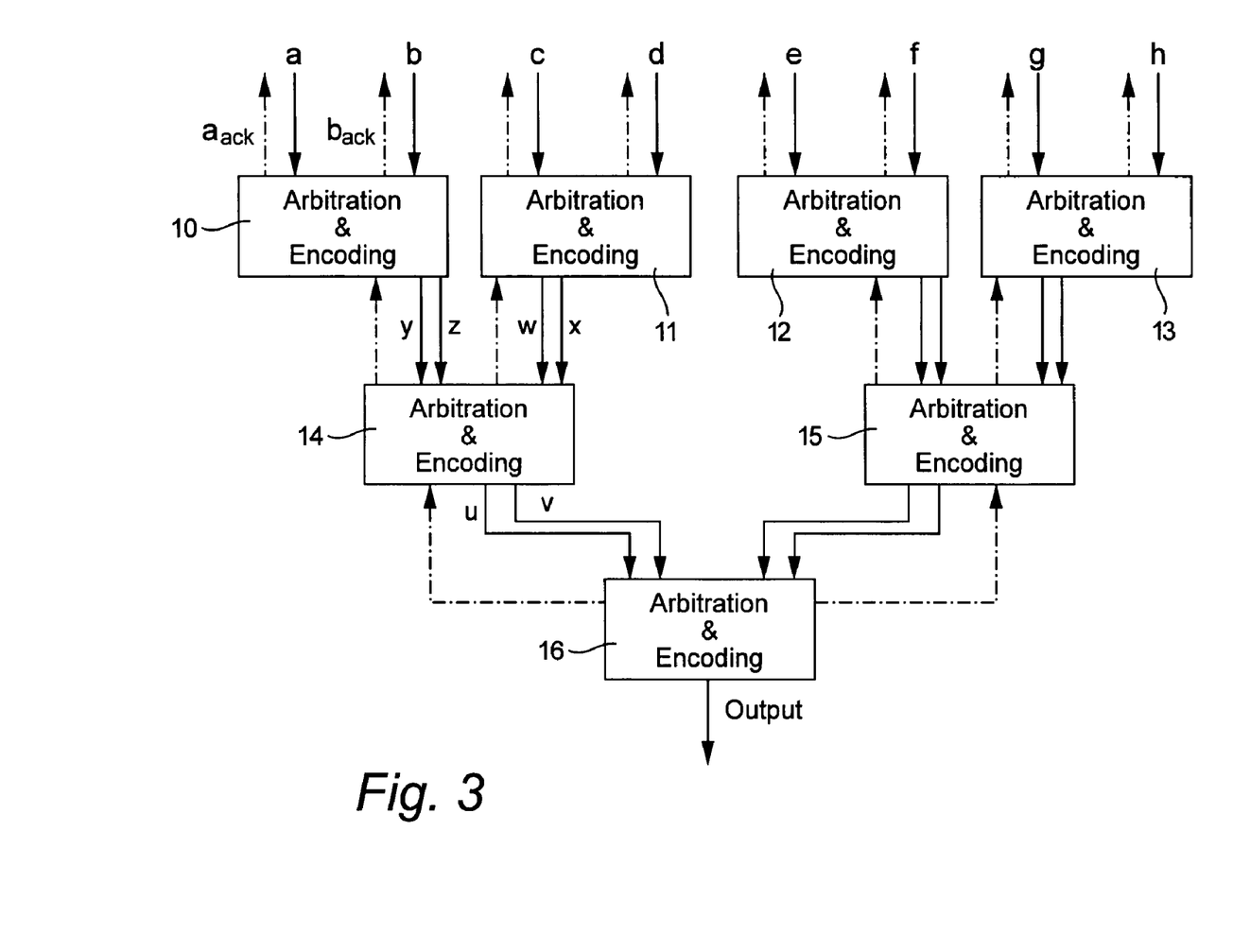
FIG. 3 is a schematic representation of the arbitration and encoding means shown in FIG. 2.

The operation of the arbitration and encoding unit 6 is illustrated schematically in FIG. 3. The unit 6 has two functions: to determine the chronological order in which pulses are to be sent to the output line 5, and to convert each output into a number indicative of the processing element that generated that output. The two functions are achieved simultaneously by the unit 6. The unit 6 shown in FIG. 3 is for a set of eight processing elements.

A first tier of the unit 6 comprises four arbitration and encoding blocks 10-13. An input side of a first arbitration and encoding block 10 is provided with two inputs a, b and two acknowledge outputs $a_{ack}$, $b_{ack}$. When the output of a processing element goes high, this is received at input a, a first output y of the block 10 goes high, and a second output z simultaneously outputs a 1-bit number representative of input a (in this case the binary number is '1'). The acknowledge output $a_{ack}$ then goes high, thereby indicating to the processing element that the output has been processed by the block 10. The output of the processing element then goes low.

If input a and input b go high at approximately the same time, then a Seitz mutual exclusion element determines which input was the first to go high (Mutual exclusion elements are described at pages 260 et seq. of 'Introduction to VLSI systems' by Mead and Conway, published by Addison Wesley). Output from the block 10 is generated accordingly. Once the output has been generated, and an acknowledge sent back to the appropriate processing element, the later of the inputs is processed and output by the block 10.

A second tier of the unit 6 comprises a pair of arbitration and encoding blocks 14,15. Referring to a first block 14 of the pair, two inputs y, w are connected to outputs of preceding blocks 10, 11. A first output u of the block 14 goes high in response to an input signal, and a second output v simultaneously outputs a 2-bit number. The most significant bit of the 2-bit number represents the input y, and the least significant bit of the 2-bit number represents the input a of the preceding block 10. Thus, the 2-bit number is the binary number '11'.

The third and final tier of the unit 6 operates in the same manner as the previous tiers. The output from the single block 16 comprising the final tier is a 3-bit binary number, and in this case is the number '111'.

In the description of FIG. 1, the output from a processing element 3 is said to be in the form of a pulse. It will be noted that in the description of FIG. 3 the output from the processing element is said to be a continuous high which ends only after an acknowledge signal has been received by the processing element. This modification is required in order to allow the arbitration and encoding unit 6 to function correctly.

Referring to FIG. 2, eight tiers of arbitration and encoding blocks are required to generate an 8-bit binary number output.

Referring to FIG. 2, four 8-bit input lines 19 are connected to the processing elements 3 and RAM 2. An arbitration and encoding unit 20 is used to arbitrate between the four input lines 19. The arbitration and encoding unit 20 operates the manner shown schematically in FIG. 2 and described above. In this case the arbitration and encoding unit includes two tiers of blocks. The arbitration and encoding unit has a 10-bit output, the extra two bits being used to distinguish between the four 8-bit input lines 19.

The 10-bit output of the arbitration and encoding unit 20 is connected to a decoder 21. The decoder converts each received 10-bit input number to an output on a corresponding 1-bit output line 1 (there are 1024 output lines). The output lines 1 correspond to the input lines 1 shown in FIG. 1.

In the pulse rate encoding system used by the embodiment of the invention, communication between neural network components takes place on a time scale of the order of 1 μs. This appears instantaneous compared with the temporal resolution of the neurons which fire at a rate no higher than of the order of 1 kHz.

The fact that the neural network component is digital provides a degree of flexibility not seen in analogue neural network components. In particular, a large range of values may be stored in the RAM 2, and this allows some of the values to be used as 'instructions' for the processing elements 3. The term 'instruction' is intended to mean that the processing element is instructed to carry out an operation other than simply adding a value to the activation level. In known prior art neural networks, the action carried out by a neuron is always the same, i.e. to add a value to the activation level. The use of instructions allows the processing elements 3 to have much more flexibility in their operation.

The use of instructions provides a neural network having properties which are closer to biologically realistic neurons. One such property is a 'leaky' integration, in other words an activation level which decays if there is no input activity over a period of time. Another property is 'refraction', meaning that a processing element 3 ignores all inputs for a certain period following firing. This limits the processing element's maximum firing rate (i.e. the rate at which the processing element 3 can produce output pulses), thereby preventing the network from becoming unstable due to ever-increasing neuronal activity. Both refraction and leaky integration imply some dependence on real time.

Refraction and leaky integration are provided in the described embodiment of the invention using a real-time reference event, for example a 32 kHz clock (not shown in FIG. 1 or 2). Pulses from the clock may transmitted as a particular binary number via the 8-bit input (for example 00000001). Where leaky integration is required, the value stored in each RAM address corresponding to this input number will instruct the processing element to decrement its activation level if the activation level is positive and increment the activation level if it is negative. Different values held in the RAM may instruct different rates of leaky integration, for example increment/decrement in response to every clock pulse, or increment/decrement in response to every second clock pulse.

Figure 4:
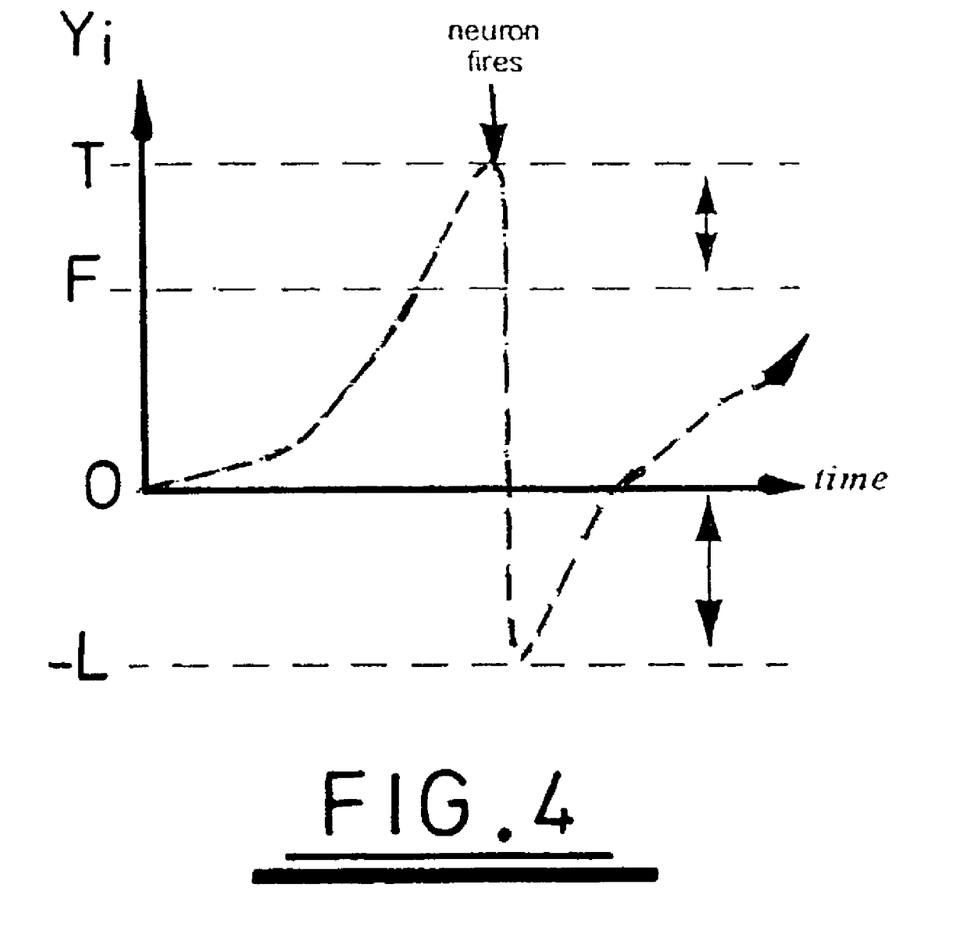
FIG. 4 is a graph illustrating a Hebbian learning mechanism.

An instruction may be provided which determines whether or not the weight should be adjusted by automatic learning algorithms (for example Hebbian learning algorithms). As an example of a neuron with automatic learning capabilities, the following neuron behaviour can be modelled as shown in FIG. 4.

The activation level of the processing element operates within the range $\{-L, +T\}$, where $-L$ is the refractory level and T is the threshold which, when reached, causes the processing element to output a pulse and the activation level to be reset to $-L$. $\{-L, 0\}$ is the refractory range of the processing element: if a weight is passed to the processing element in response to an input pulse, the weight is not added to the activation level (the activation level is unchanged), and the weight itself is decremented. $\{0, F\}$ is the weakly excited range: if a weight is passed to the processing element in response to an input pulse it will be added to the activation level and the weight itself will be unchanged by the learning mechanism. {F, T} is the strongly excited range: if a weight is passed to the processing element in response to an input pulse it will be added to the activation level and the weight itself will be incremented.

Figure 5A:
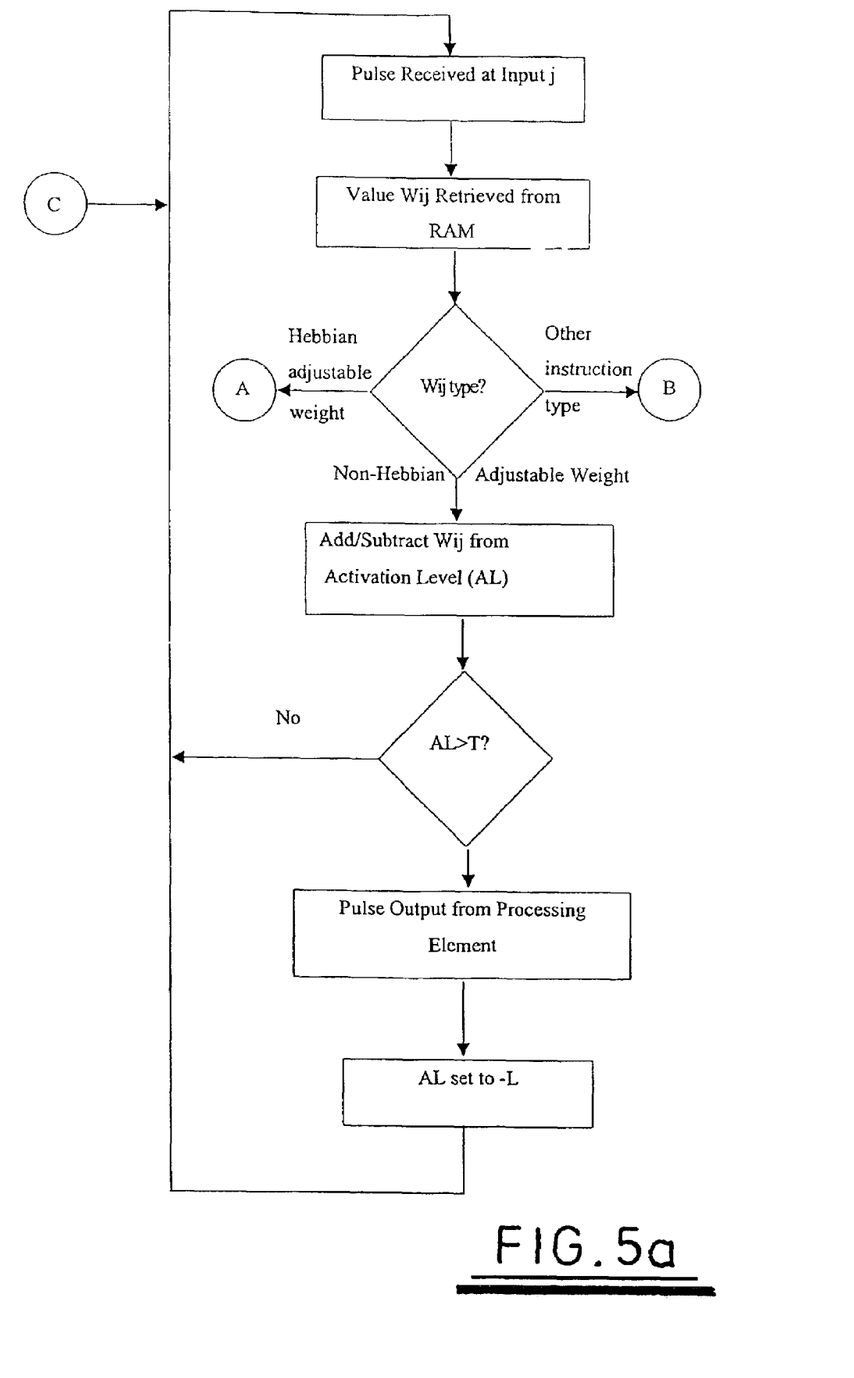
FIGS. 5a to 5c are flow charts illustrating operation of the neural network component.
Figure 5B:
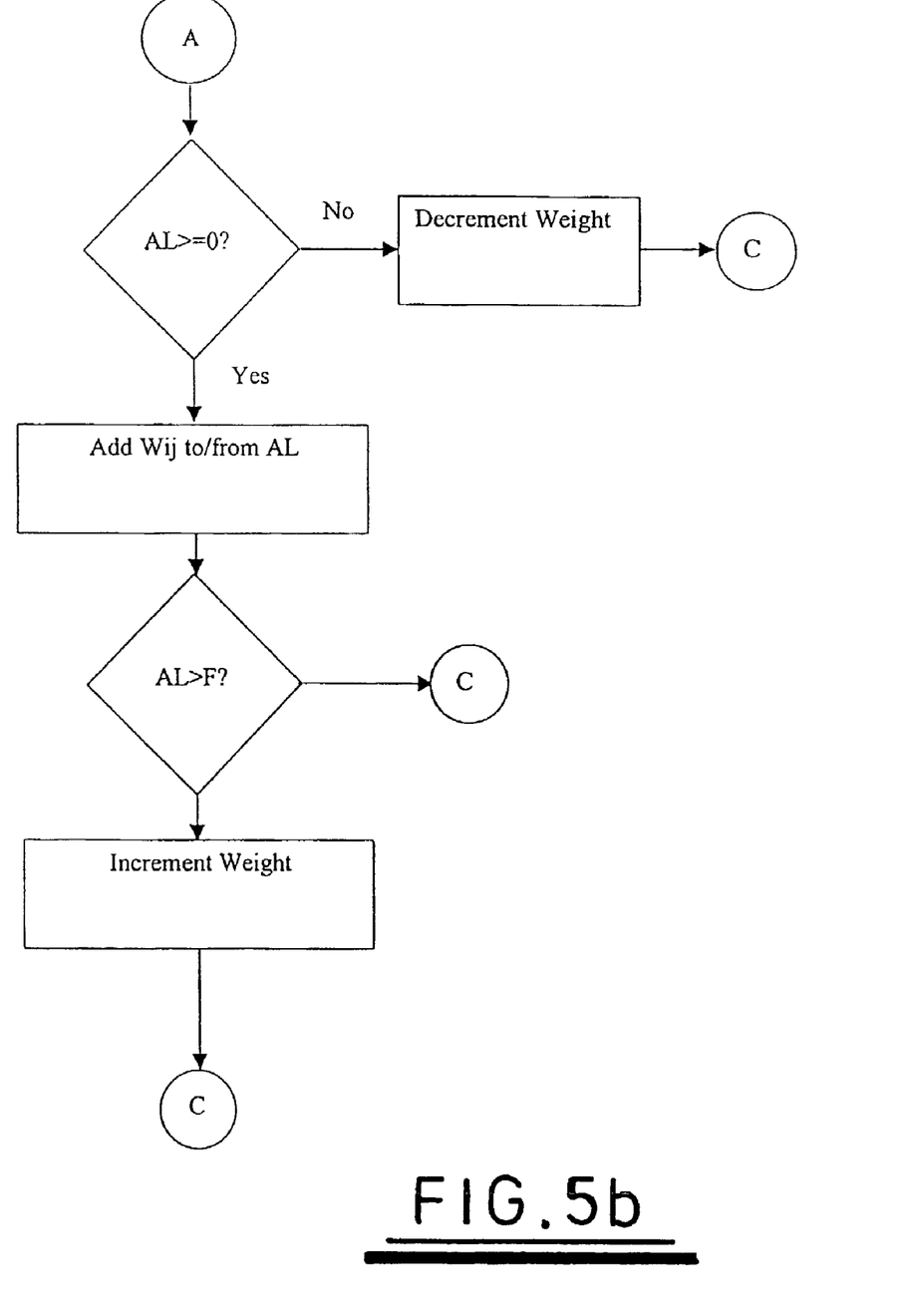
Figure 5C:
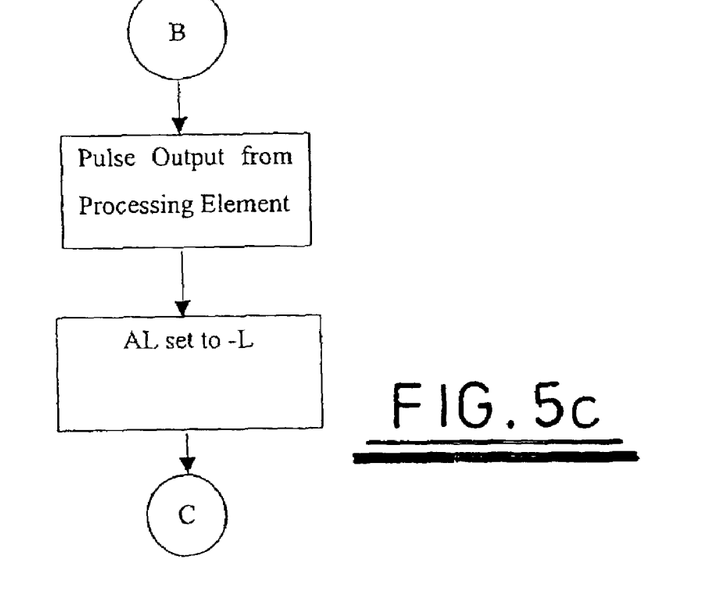

The operation of a processing element arranged to operate in accordance with the model shown in FIG. 3 is shown schematically by a flow chart in FIGS. 5a-c.

Referring first to FIG. 5a, a pulse is received at a given input j. The value associated with that input j for a given processing element is retrieved from the RAM and passed to the processing element. The value will fall within one of three ranges: a first range corresponds to weights which are to be added to the activation level, a second range corresponds to weights which are to be added to the activation level and in addition instruct the processing element that the weight associated with that input is to be incremented, and a third range comprises instructions other than weights.

The remainder of FIG. 5a deals with a value which falls within the first range. The value is added to the activation level of the processing element (the activation level will be reduced if the weight is negative). If the activation level following addition of the value is less than the threshold T then no further action is taken. If the activation level is greater than the threshold T, then the processing element outputs a pulse and the activation level of the processing element is reduced to −L.

If the value falls within the second range then operation of the processing element as shown in the flow chart branches to FIG. 5b. If the activation level of the processing element is greater than or equal to zero then the value is added to the activation level of the processing element. Following this, if the activation level is greater than F then the value saved in the RAM is incremented.

If the activation level of the processing element is less than zero then the value is not added to the activation level, and the value saved in the RAM is decremented.

If the value falls within the third range, this indicates some other form of instruction. For example, as shown in FIG. 5c, the processing element may be instructed to emit a pulse irrespective of the activation level, and reset the activation level to the refractory level.

This Hebbian learning algorithm, which results in a stable neural network if appropriate values are chosen, depends on a mechanism to return the activation level from −L to 0 which is separate from the numerical weight processing, and therefore depends on the use of an 'increment towards zero over time' instruction which may be implemented as described above.

It will be understood by those skilled in the art that the processing elements may be capable of executing other instructions, which may be defined by values stored in the RAM value memory. For example, the activation level may be reset to the refractory level without firing the neuron. This models a strongly inhibitory input.

Referring again to FIG. 1, the neural network component may include a conventional processor (not shown) with read-write access to the RAM value store 4. In addition, the processor may have the capability to monitor and generate input and output to neural activity streams, using suitable interface peripherals incorporated into the neural network component.

Processor accesses to the RAM value store 4 and the neural activity streams can be arbitrated asynchronously into the fully operational network with minimal interference with the neural processing provided that the network is not operating near to saturation at the time. One monitor processor could supervise a number of neural network components, but a very large system may require several such processors. An implementation based on 1 Gbit DRAM technology might have a monitor processor on each chip. Thus, the neural network may be implemented as a very large number of neural network components supervised by a parallel network of conventional processors. The ease with which the architecture connects to conventional machines is a merit of the invention. The control processor greatly extends the flexibility of the architecture and provides a close coupling between the neural processing and a conventional, sequential machine.

If communication is implemented using clocked logic the temporal firing information will be quantised. If asynchronous logic is used this quantisation is avoided. The use of asynchronous logic is therefore advantageous.

Although in the illustrated embodiment one processing element corresponds to one neuron, it will be appreciated that a processing element may be responsible for performing the calculations for more than one neuron.

What is claimed is:

1. A neural network component, the component comprising:
   an addressable digital memory;
   a plurality of inputs configured to receive addresses for locations in said digital memory;
   at least one processing element for performing a plurality of different operations based on respectively corresponding values received from memory locations addressed via said inputs;
   at least one output providing the result of processing performed by said processing element; and
   said digital memory storing values representing processing element instructions at addresses respectively corresponding to the processing elements, said instructions corresponding to different operations;
   wherein the at least one processing element is configured to receive one of said stored values from the digital memory in response to a signal at an input, and is thereby instructed to execute a corresponding one of said plurality of operations by the value that is received from the digital memory; and
   wherein one of said plurality of different operations comprises generation of an output by the at least one processing element, and then resetting an activation level of the at least one processing element to a predetermined minimum level.

2. A neural network component, the component comprising:
   an addressable digital memory;
   a plurality of inputs configured to receive addresses for locations in said digital memory;
   at least one processing element for performing a plurality of different operations based on respectively corresponding values received from memory locations addressed via said inputs;
   at least one output providing the result of data processing performed by said processing element; and
   said digital memory storing values representing processing element instructions at addresses respectively corresponding to the processing elements, said instructions corresponding to different operations;
   wherein the at least one processing element is configured to receive one of said stored values from the digital memory in response to a signal at an input, and is thereby instructed to execute a corresponding one of said plurality of operations by the value that is received from the digital memory; and
   wherein one of said plurality of different operations comprises resetting an activation level of the at least one processing element to a predetermined minimum level without an output being generated by the at least one processing element.

3. A method of operating a neural network component, the method comprising:
  storing values representing neural network processing element instructions in a digital memory at addresses respectively corresponding to neural network processing elements;
  transferring one of said stored values representing an instruction to at least one said processing element; and
  executing one of a plurality of pre-determined different operations at the processing element in response to the respectively corresponding value that is received from the digital memory;
  wherein said plurality of pre-determined operations include at least one of:
    (a) changing an activation level of a neuron processing element by (i) increasing the neuron activation level if the value is negative or (ii) decreasing the neuron activation level if the value is positive;
    (b) decaying a neuron activation level dependent upon the instruction value;
    (c) generating a neuron output and then resetting the activation level of the neuron to a predetermined minimum level;
    (d) resetting a neuron activation level to a predetermined minimum level without generating an output;
    (e) modifying a neuron activation level in accordance with an automatic learning algorithm; and
    (f) modifying the value held in memory for a neuron in accordance with an automatic learning algorithm.

4. A method for providing a neural network component having neuron activity levels that are controllable to be either monotonic or non-monotonic functions of neuron inputs, said method comprising:
  receiving a neuron processing instruction from a respectively associated digital memory location addressed by a neuron input signal;
  if the received instruction falls within a first predetermined range, performing a neuron processing function which monotonically changes the neuron's activity level; and
  if the received instruction falls within a second predetermined range, performing a neuron processing function which non-monotonically changes the neuron's activity level.

5. A neural network component having neuron activity levels that are controllable to be either monotonic or non-monotonic functions of neuron inputs, said component comprising:
  means for receiving a neuron processing instruction from a respectively associated digital memory location addressed by a neuron input signal;
  means for determining if the received instruction falls within a first predetermined range, and, if so, performing a neuron processing function which monotonically changes the neuron's activity level; and
  means for determining if the received instruction falls within a second predetermined range, and, if so, performing a neuron processing function which non-monotonically changes the neuron's activity level.

6. A method of providing a neural network component having a neuron activity level that can be a non-monotonic function of its inputs, said method comprising:
  storing processing instructions for each of plural processing elements in respective locations of a read-write digital memory addressed by inputs to said processing elements;
  receiving a processing instruction from said memory for a processing element in response to a received input;
  if the received processing instruction falls within a first predetermined range, adding the received instruction to the respectively corresponding neuron activation level thus causing a monotonic change in its activation level;
  if the received processing instruction falls into a second predetermined range, adding the received instruction to the respectively corresponding neuron activation level and storing a different processing instruction in said memory for subsequent use by the respectively corresponding neuron; and
  if the received processing instruction falls into a third predetermined range, performing an operation for the respectively corresponding neuron that is based on the received instruction and including at least one of the following operations:
    (a) decay of an activation level to zero, by increasing the activation level if it is negative or decreasing the activation level if it is positive;
    (b) generation of an output and then resetting an activation level to a predetermined minimum level;
    (c) resetting an activation level to a predetermined minimum level without an output being generated;
    (d) modifying an activation level in accordance with an automatic learning algorithm; and
    (e) modifying the corresponding processing instruction value held in the digital memory in accordance with an automatic learning algorithm.

7. A method as in claim 6 wherein said decay is at a rate dependent upon the received instruction.

8. A method as in claim 6 wherein said decay is at a rate controlled by a clock.

9. A method as in claim 6 wherein said automatic learning algorithm comprises a Hebbian learning algorithm.

10. A method as in claim 6,
  wherein an output generated from a neural network component represents the digital memory address associated with the neural processing element from which the output emanated.

11. A method as in claim 6 further comprising:
  determining the chronological order of signal pulses received from neural processing elements; and
  representing each signal pulse as a multi-digit digital value corresponding to the digital memory address associated with the neural processing element from which the output emanated.

12. A method as in claim 6 further comprising:
  asynchronously arbitrating accesses to at least one computer processor for performing processes associated with plural neural processing elements.

* * * * *